Oct. 28, 1969 R. J. PRICE ET AL 3,475,748

GAIN STABILIZATION DEVICE

Filed Aug. 9, 1965

INVENTORS
ROBERT J. PRICE
ERNEST W. FISCHER JR.
BY Earl F. Kotts
ATTORNEY

United States Patent Office 3,475,748
Patented Oct. 28, 1969

3,475,748
GAIN STABILIZATION DEVICE

Robert J. Price, 4901 Pine Ridge Way, Julian, Calif. 92036, and Ernest W. Fischer, Jr., 1431 Cascade Place, El Cajon, Calif. 92021

Filed Aug. 9, 1965, Ser. No. 478,253
Int. Cl. H04l *3/00;* H03k *13/02*
U.S. Cl. 340—347 7 Claims

ABSTRACT OF THE DISCLOSURE

A gain stabilization device for correcting a gain of an amplifier, particularly when the amplifier is used with an analog to digital converter, in such manner as to correct against a standard for the composite errors of the amplifier and converter.

It is an object of the present invention to provide a device for generating a corrective control signal by comparing a digital number, obtained by reading a standard, against a predetermined number.

It is a further object of the present invention to provide such a device which generates the correction signal periodically so as not to interrupt normal operation of the equipment with which it is used.

It is another object of the present invention to provide a gain stabilization device for use with an amplifier and analog to digital converter which generates corrective control signals by periodically comparing a digital number, obtained by reading a standard, against a predetermined number, such functions being accomplished in the presence of high common mode signals in the amplifier.

It is a further object of the present invention to provide a control device for use with an analog amplifier which adjusts the gain up and down with pulses obtained by comparing two digital numbers, one of which is dependent upon the amplifier gain.

Other objects and attendant advantages of this invention will be readily appreciated as the same becomes better understood by reference to the following detailed description when considered in connection with the accompanying drawings.

Figure 1:
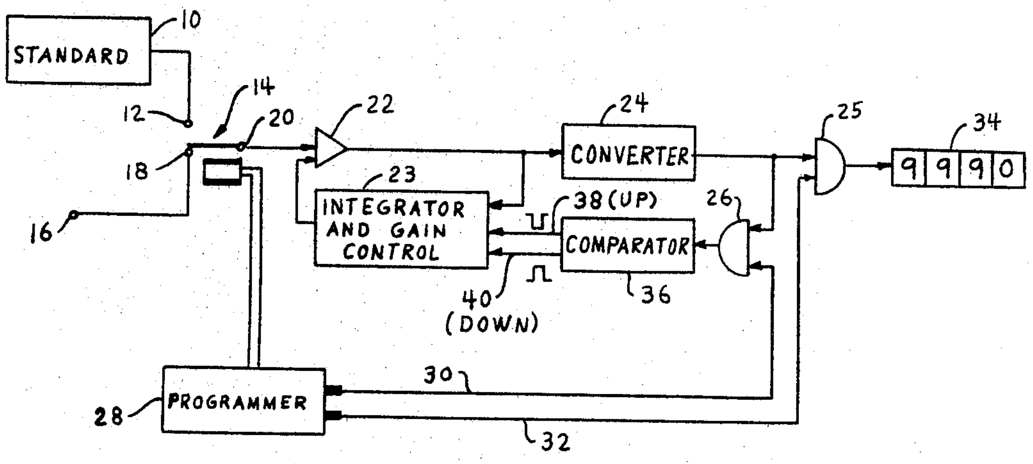
FIGURE 1 is a block diagram of the stabilization device of the present invention.
Figure 3:
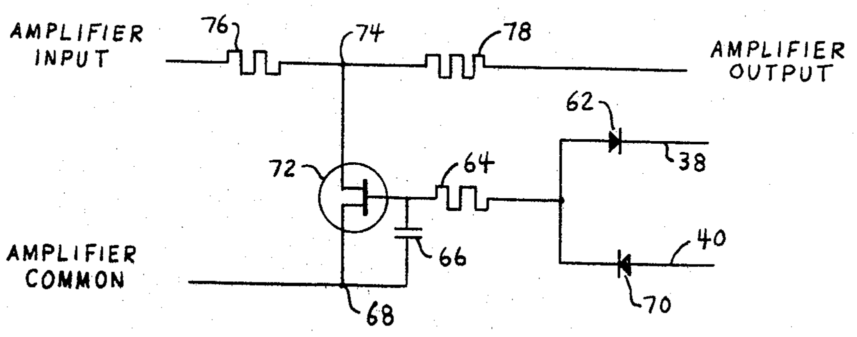
FIGURE 3 is a schematic of the integrator and gain control of FIGURE 1.

Referring to FIGURE 1 of the drawings, a voltage standard 10, which can take the form of a resistive bridge that delivers a known and precise number of millivolts per volt input, is connected to contact 12 on relay 14. A signal input is indicated at 16 which receives an unknown voltage to be measured by the system. The unknown signal voltage is applied to contact 18 of relay 14. The output from point 20 of the relay is fed to amplifier 22, and the output of amplifier 22 goes to an analog to digital converter 24. The amplifier is a conventional D.C. amplifier. The converter is a high speed solid state unit capable of reading the output of amplifier 22 in binary and decimal form, such as the Model V16–AD produced by Adage, Inc., of Cambridge, Mass. A portion of the output of amplifier 22 is taken to an integrator and gain control 23 which is a special configuration as shown in FIGURE 3.

The data output of the converter 24 goes to AND gate 25 and AND gate 26. When AND gate 25 is conducting, AND gate 26 is cut off through a relay switching programmer 28. The two lines 30 and 32 connect the programmer to the gates 26 and 25 respectively. When the relay armature engages contact 18, a positive signal is fed to gate 25 from programmer 28. The positive pulses from the converter 24 are passed through the gate 25 to a utilization device such as digital voltmeter 34.

Figure 2:
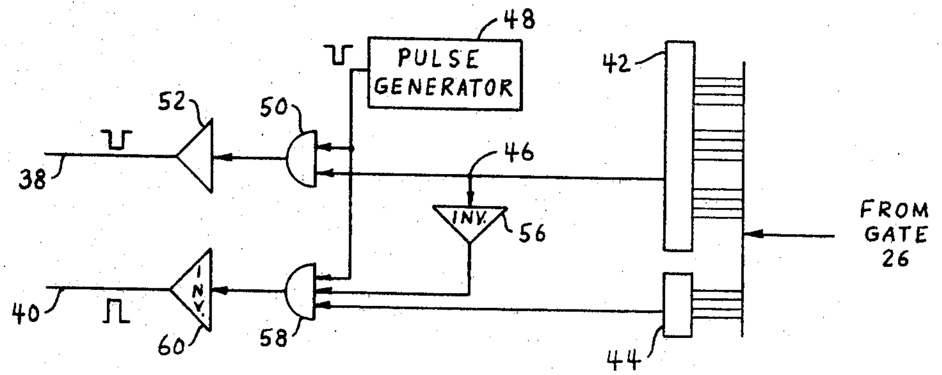
FIGURE 2 is a schematic of the comparator of FIGURE 1.

When the relay switching programmer 28 moves the armature of relay 14 to contact 12 the positive voltage on line 32 is eliminated, and a positive voltage is established on line 30 to gate 26. Thus, gate 25 is open and gate 26 is closed. The standard 10 is now connected through amplifier 22, analog to digital converter 24 and gate 26 to a digital comparator 36. The comparator is a special circuit as shown in FIGURE 2. The output of the comparator includes an up-line 38, which passes negative pulses from the comparator and a down-line 40, which passes positive pulses from the comparator. The lines 38 and 40 lead into the integrator and gain control 23. The output of the integrator and gain control 23 is fed back into the input of amplifier 22.

Ordinarily the programmer 28 establishes the armature of relay 14 in engagement with contact 18. The signal from the input 16 is amplified in amplifier 22 and digitized in the converter 24. Digital number control by the signal from point 16 is provided to the utilization device 34.

Periodically the programmer 28 transfers the relay armature to the contact 12. The signal from standard 10 is then amplified and a digital number signal corresponding to the standard signal is provided from the converter 24 to the AND gate 26. The programmer also eliminates the positive voltage on line 32 and establishes a positive voltage on line 30. The gate 26 passes the output of converter 24 to comparator 36. The comparator 36 compares the digital number reproduced from the standard against a predetermined number. If the number is too high, a positive pulse is delivered from comparator 36 to the integrator and gain control 23 over the down line 40. If the number is too low, a negative pulse is provided on the up line 38.

The pulses from the comparator 36 are integrated in the unit 23 to provide a D.C. voltage which varies up or down in amplitude as a function of the digital error at the input of the comparator 36.

The D.C. voltage of the integrator and gain control unit 23 controls a resistive element, which takes the form of a field effect transistor, in the feed back to amplifier 22. This causes the amplifier gain to correct for the error on the next reading. After one or more readings of the standard 10, relay 14 is returned by programmer 28 to read the unknown signal at contact 16 and the system is now in calibration with the standard 10. In a construction which has been built the converter makes 20 readings per second, fifteen of the unknown signal and five of the standard.

The logic employed in the comparator is shown in FIGURE 2. The number 9990 has been selected as the predetermined number against which the analog to digital converter reading of the standard will be compared. The details of the circuit components are not shown since they are known to those normally skilled in the art.

The binary coded decimal data corresponding to the tens, hundreds and thousands decades of the number from the output of the converter 24 (FIGURE 1) is applied through the AND gate 26 to the AND gates 42 and 44 (FIGURE 2). The AND gate 42 is a well known circuit which requires that all digits from the converter be positive to give a positive voltage out. This is the condition that exists for 999. For any other number, at least one of the binary digits is negative and the resulting output voltage from gate 42 to point 46 is also negative. A pulse generator in the form of a multivibrator is provided at 48. The pulse generator generates negative pulses. The negative output at point 46 is gated with the negative pulses from the pulse generator in an AND gate 50 thereby delivering a negative pulse to non-inverting amplifier 52. The amplifier 52 delivers a negative pulse on the up line 38.

If the tens, hundreds and thousands decades read 999, the output of the AND gate 42 to point 46 is positive and AND gate 50 will not pass the negative pulses from the pulse generator 48 to the amplifier 52. In this situation, there is no drive on the up-line 38.

The AND gate 44 combines the binary coded decimal data from the units decade and produces a negative voltage on line 54 whenever the units decade does not read zero. In this situation, the negative voltage is gated by AND gate 58 with the negative pulses from pulse generator 48 and the negative signal from inverting amplifier 56. It will be recalled that when the AND gate 42 is reading 999, the output at point 46 is positive. The inverting ampifier 56 converts this into a negative voltage at AND gate 58. This allows the negative pulse from pulse generator 48 to pass thorugh AND gate 58 to inverting amplifier 60 where it is converted to a positive pulse on down-line 40.

From the above, it is apparent that when the number fed from the converter 24 is less than 9990, up-drive negative pulses will appear on up-line 38, and when the number exceeds 9990, down-drive positive pulses will appear on down-line 40. The same type of logic can be developed for any desired number.

The schematic of FIGURE 3 shows the circuit used to control the gain of amplifier 22 in FIGURE 1 using the pulses supplied by the comparator 36.

Negative up-drive pulses are applied on line 38 to the cathode of a diode 62, which conducts current through resistor 64 charging a capacitor 66 negatively with respect to the amplifier common point 68. Positive down-drive pulses are applied to the anode of a diode 70, which conducts current through resistor 64 charging capacitor 66 positively with respect to the amplifier common 68. The charge on capacitor 66 acts as a voltage bias for the gate of field effect transistor 72. The bias on the gate of field effect transistor 72 affects its impedance between points 68 and 74. This impedance affects the amplifier feedback network comprising resistor 76 and resistor 78 and thus controls the gain in amplifier 22.

The negative up-pulses from line 38 cause a more negative voltage to the P-type gate of the transistor 72 and increases the impedance of said transistor. This results in more positive feedback to the amplifier 22. The positive down-pulses from line 40 provide a more positive bias on the gate of transistor 72 and result in less impedance in the transistor. This permits greater current flow through the transistor to the amplifier common 68 with less feedback through resistor 76 to the input of amplifier 22. An N channel transistor can be used for transistor 72 by reversing the polarity of the up and down drive pulses.

In operation, the up and down drive pulses automatically adjust the charge on the capacitor 66 and thus maintain the gain of the amplifier 22 at the value which will cause the converter 24 to read the standard 9990. The amplifier common need not be at ground potential as long as the diode bias and pulse voltages are selected so that diodes 62 and 70 will not discharge capacitor 66 when the pulses are not present. This allows the amplifier 22 to operate with large common mode signals while the comparator logic operates at ground reference potential.

For example, if the input to the amplifier is from a bridge circuit, both the amplifier common and the amplifier input would be above ground potential by perhaps as much as 50 volts or more. The gain control pulses and the circuitry of comparator 36 can still operate with a ground common as long as the voltage between pulses on lines 38 and 40 is such as to bias off diodes 62 and 70 during the time the amplifier is sampling a signal from either the standard 10 or the input 16. If the amplifier common is at +50 volts with respect to ground, it is only necessary for the voltage on line 38 to be slightly greater than +50 volts between up drive pulses, thus making diode 62 an open circuit to the +50 volts on the anode end which is connected to the amplifier common through transistor 72. The voltage on line 40 may be zero at this time, as diode 70 will not conduct with +50 volts on its cathode end.

Having described out invention, we claim:

1. In combination:

an amplifier;

switching means which automatically switches between a voltage standard and an unknown signal input, connected to the input of said amplifier;

a variable resistance feedback network connected to said amplifier;

an analog to digital converter driven by said amplifier;

a utilization device coupled to the output of said converter when said switching means is connected to the unknown signal input;

a digital comparator coupled to the output of said converter when said switching means is connected to the voltage standard, said comparator producing pulses of one polarity on a first output if the number from the converter is greater than a predetermined number and pulses of opposite polarity on a second output if the number from the converter is less than the predetermined number;

an integrator connected to the output of said comparator to provide a D.C. voltage influenced by the pulses from said comparator;

and a variable resistance element connected in the amplifier feedback network and to the integrator output, said variable resistance element responding to the output of said integrator to alter the gain of the amplifier in a direction which reduces the error of subsequent readings of the standard.

2. A device as claimed in claim 1 wherein the variable resistance element is a field effect transistor.

3. A device as claimed in claim 1 wherein the pulses from the comparator are formed at ground reference and the common of the amplifier is at a potential other than ground.

4. In combination:

a D.C. amplifier;

switching means;

program means for automatically positioning said switching means alternately between a voltage standard representing a predetermined number and an unknown signal input;

a variable resistance feedback network connected to said amplifier;

an analog to digital converter driven by said amplifier;

a first gate connected to the output of said converter;

a utilization device connected to the output of said first gate, said program means also having an input to said first gate;

a second gate with an input connected to the output of said converter and an input connected to said program means;

a digital comparator connected to the output of said second gate, said comparator connected through said second gate to the output of the converter and said standard connected to the input of the amplifier by the program means in one position, said comparator producing pulses of one polarity on a first output if the number from the converter is greater than the predetermined number and pulses of opposite polarity on a second output if the number from the converter is less than the predetermined number;

an integrator connected to the outputs of said comparator to provide a D.C. voltage influenced by the pulses from said comparator; and a variable resistance element connected in the amplifier feedback network and to the integrator output, said variable resistance element responding to the output of said integrator to alter the gain of the amplifier in a direction which reduces the error of subsequent readings of the standard;

the program means periodically positioning the switch to the sigal input and energizing the first gate to provide a digital input representing said unknown signal to said utilization device.

5. A gain control for an analog amplifier including:

first means for coupling to the output of the amplifier and converting the amplifier output to digital data;

second means for periodically feeding a standard into the amplifier;

third means for comparing the resultant output of the first means against a predetermined digital number corresponding to the standard and producing pulses of one polarity if the digital output of the first means is higher than the predetermined number and pulses of opposite polarity if the digital output is lower than the predetermined number;

and gain control means electrically connected to said third means and the ampifier input for integrating the pulses from said third means providing a corrective signal to the amplifier.

6. A device as claimed in claim 5 wherein the pulses are formed at ground reference and the common of the amplifier is at a potential other than ground.

7. A gain control for an analog amplifier including:

first means for coupling to the output of the amplifier and converting the amplifier output to digital data;

second means for periodically feeding a standard into the amplifier, third means for comparing the resultant output of the first means against a predetermined digital number corresponding to the standard and producing pulses of one polarity if the digital output of the first means is higher than the predetermined number and pulses of opposite polarity if the digital output is lower than the predetermined number;

a feedback circuit between the input and the output of the amplifier; and gain control means which includes a field effect transistor electrically connected between the amplifier feedback circuit and the amplifier common, the input to the gate of said field effect transistor includes a capacitive circuit whereby the pulses from said third means control the voltage at the gate of the field effect transistor and hence the impedance which it presents to the amplifier feedback circuit.

References Cited

UNITED STATES PATENTS

| | | | |
|---|---|---|---|
| 2,987,486 | 7/1959 | Alexander et al. | 340—347 |
| 2,940,071 | 6/1960 | Kindred | 340—347 |
| 3,042,911 | 7/1962 | Paradise et al. | 340—347 |
| 3,070,786 | 12/1962 | MacIntyre | 340—347 |
| 3,142,834 | 7/1964 | Falk et al. | 340—347 |
| 3,267,458 | 8/1966 | Anderson et al. | 340—347 |
| 3,287,723 | 11/1966 | Metcalf | 340—347 |

MAYNARD R. WILBUR, Primary Examiner

C. D. MILLER, Assistant Examiner

U.S. Cl. X.R.

330—2